United States Patent
Xue et al.

(10) Patent No.: US 8,054,754 B1
(45) Date of Patent: Nov. 8, 2011

(54) METHOD AND SYSTEM FOR SERVICE INTERRUPTION NOTIFICATION

(75) Inventors: Wen Xue, Overland Park, KS (US); Raymond E. Reeves, Olathe, KS (US); Ryan A. Wick, Punta Gorda, FL (US)

(73) Assignee: Sprint Spectrum L.P., Overland Park, KS (US)

(*) Notice: Subject to any disclaimer, the term of this patent is extended or adjusted under 35 U.S.C. 154(b) by 148 days.

(21) Appl. No.: 12/508,510

(22) Filed: Jul. 23, 2009

(51) Int. Cl.
*G01R 31/08* (2006.01)
(52) U.S. Cl. .................................. 370/248; 370/352
(58) Field of Classification Search .................. 370/242, 370/244, 248, 250–252, 331–333, 352–354, 370/356, 493–495, 902
See application file for complete search history.

(56) References Cited

U.S. PATENT DOCUMENTS

| | | | |
|---|---|---|---|
| 5,710,985 A | 1/1998 | Matsumoto | |
| 6,031,897 A | 2/2000 | Bremer et al. | |
| 6,574,213 B1 | 6/2003 | Anandakumar et al. | |
| 7,688,809 B2 * | 3/2010 | Dendukuri et al. | 370/352 |
| 2005/0185657 A1 | 8/2005 | Karanassos | |
| 2006/0268828 A1 | 11/2006 | Yarlagadda | |
| 2007/0127447 A1 | 6/2007 | Cho | |
| 2007/0274284 A1 | 11/2007 | Dendukuri et al. | |
| 2008/0014956 A1 * | 1/2008 | Balasubramanian | 370/230 |

* cited by examiner

*Primary Examiner* — Pao Sinkantarakorn
*Assistant Examiner* — Phuongchau B Nguyen

(57) ABSTRACT

Exemplary methods and systems may provide a soft-inactivity notification during a VoIP call, which according to an exemplary embodiment involves a SIP session and packet-data communications between participants in the VoIP call. The method comprises (a) detecting that packet-data communications in the VoIP call have been interrupted; (b) in response to determining that the packet-data communications have been interrupted, making a determination as to whether or not the SIP session is active; (c) if the SIP session is active, then initiating a soft-inactivity notification procedure; and (d) otherwise, if the SIP session is inactive, refraining from initiating the soft-inactivity notification procedure. The soft-inactivity notification thus notifies a user that while the call has been interrupted, the call may be re-established without requiring the user to reconnect.

20 Claims, 4 Drawing Sheets

METHOD AND SYSTEM FOR SERVICE INTERRUPTION NOTIFICATION

BACKGROUND

The advent and evolution in recent years of technologies and standards for high-rate transmission of packet data over cellular radio access networks has been part of a larger picture that includes advances in the development of packet transport networks and service networks for delivery of packet-data services, all collectively referred to as "third generation" (3G) networks.

In the context of the larger picture, there have been industry-wide efforts to coordinate various elemental functions and subsystems within a common architectural framework and based upon common, standard interfaces and protocols for communication. Industry consortia including the $3^{rd}$ Generation Partnership Project (3GPP) and the 3GPP2, among others, have developed and published specifications relating to numerous aspects of 3G networks, from access devices, to access networks, to core transport networks, to service-delivery networks, as well as the communication methods that form the basis for network operation and services. [5960]

Packet-data transport and services in 3G networks are based in a large part on the "Internet Protocol" (IP) and the IP suite of protocol standards. As such, 3G networks themselves incorporate IP networks. In particular, IP-packet-based media services, such as "Voice over IP" (VoIP), video streaming, and packet-media broadcast collectively comprise an "IP Multimedia Subsystem" (IMS) network within a 3G system. Built upon standard signaling protocols, such as Session Initiation Protocol (SIP), standard media transport protocols, such as Real-time Transport Protocol (RTP), and standard policy management protocols such as Common Open Policy Service (COPS), among others, the IMS network provides an infrastructure for integrating new and emerging IP-based services for subscribers in 3G networks. In turn, owners and operators of 3G networks can generate revenue by charging subscribers for IMS-based services such as VoIP.

OVERVIEW

When a user connects for a voice-over-IP (VoIP) call via a radio access network (RAN), the VoIP call is generally reliant on the user's radio frequency (RF) connection to the RAN. When a user drives into a RF-coverage hole (i.e., an area in which coverage is unavailable) and the user's RF connection is lost, and thus the VoIP call is interrupted. If the RF connection is only lost temporarily (such as when an RF-coverage hole is small, for instance), the VoIP call may not be dropped altogether, as the user may be able to regain their RF connection shortly after losing it and continue the VoIP call without reconnecting. This is the case because a VoIP call is typically initiated by creating a SIP session, and this SIP session may persist even after an RF connection is lost. While data communications are disrupted, such as due to a lost RF-connection, but the SIP session for the VoIP call remains active, the call may be referred as being in a "soft inactivity" state. Thus, if a user's RF connection is re-established while in a soft-inactivity state, the user may continue the VoIP call without reconnecting.

Unfortunately, in existing systems, users are often unaware when an RF connection is lost or a VoIP call enters a soft inactivity state for other reasons, and therefore may continue speaking until they realize there is no response from the other side. Furthermore, even if the user realizes that their connection has been lost, they have no way of knowing whether there is a possibility that the call may be re-established (as is the case while the SIP session for the call remains active). As a result, when a user becomes aware that their RF connection has been lost, the user typically assumes that the VoIP call has been dropped completely, and hangs up and redials or hangs up and waits for the other party to call them back. This can be a frustrating experience for users. Accordingly, exemplary methods and systems are disclosed that provide a soft-inactivity notification during a VoIP call, when the RF connection is lost (or more generally when data communications during the VoIP call are interrupted), but the call may still be re-established if the user waits for the RF connection to be regained (such as while the SIP session for the VoIP call is still active).

In one aspect, disclosed herein is a method for providing a soft-inactivity notification during a VoIP, which according to an exemplary embodiment involves a SIP session and packet-data communications between participants in the VoIP call. The method comprises (a) detecting that packet-data communications in the VoIP call have been interrupted; (b) in response to determining that the packet-data communications have been interrupted, making a determination as to whether or not the SIP session is active; (c) if the SIP session is active, then initiating a soft-inactivity notification procedure; and (d) otherwise, if the SIP session is inactive, refraining from initiating the soft-inactivity notification procedure.

In another aspect, disclosed herein a system configured for a soft-inactivity notification procedure during a VoIP call, which according to an exemplary embodiment involves a SIP session and packet-data communications between participants in the VoIP call. The system comprises (i) a communication interface configured to send and receive VoIP communications; (ii) data storage; and (iii) program logic stored in the data storage and executable by at least one processor to: (a) detect that packet-data communications in the VoIP call have been interrupted; (b) in response to detecting that the packet-data communications have been interrupted, determine whether or not the SIP session is active; (c) if the SIP session is active, then initiate a soft-inactivity notification procedure; and (d) if the SIP session is inactive, then refrain from initiation of the soft-inactivity notification procedure.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Figure 1:
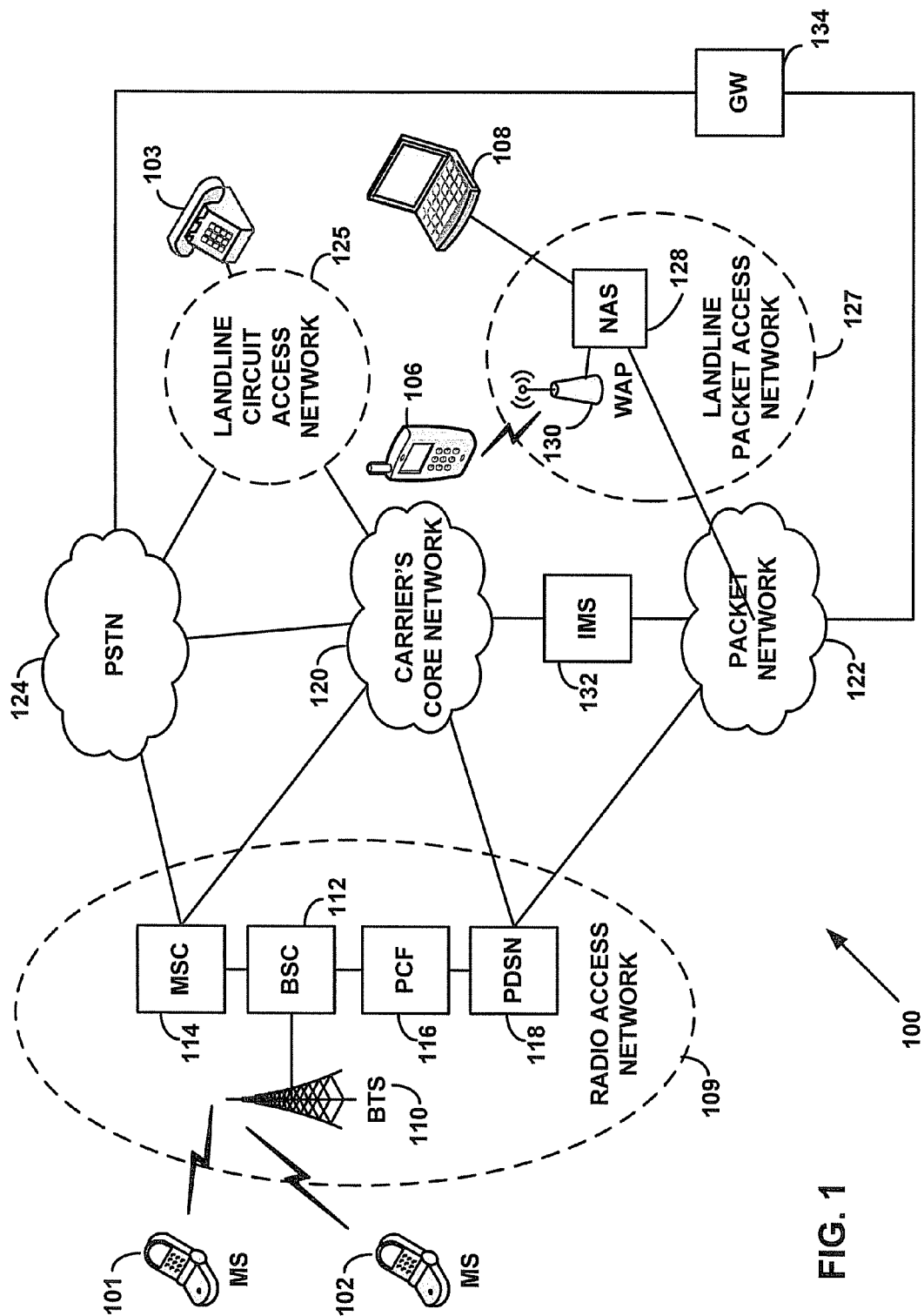
FIG. 1 is a simplified block diagram illustrating a telecommunication network in which an exemplary embodiment may be implemented.

Exemplary embodiments of the invention may be understood by considering FIG. 1, which depicts a telecommunication network 100 that includes, by way of example, network elements and components suitable for supporting both circuit-based telecommunication services, such cellular and landline voice calls, and packet-based data communication services, such as web browsing, VoIP, and e-mail communication.

Example network 100 includes a carrier's core network 120, which is then connected to one or more access networks/ systems, such as a radio access network (RAN) 109, landline circuit access network 125, and landline packet access network 127, each of which may allow subscribers to engage in telecommunication services such as voice telephony, voice-over-IP (VoIP), and other data communications. Each of the access networks is coupled, in turn, with one or more transport networks, such as the public switched telephone network (PSTN) 124 and (either directly or through core network 120, via gateway (GW) 134) a packet network 122.

Core network 120 provides connectivity to various elements, components and entities of network 100, and serves as a transport network for communications among them. Operationally, core network 120 also supports delivery of circuit-based user services and features via signaling and bearer channels, for example, carried over inter-switch digital trunks for regional and long-distance calls. As such, core network 120 may also comprise what is commonly referred to as a backbone network. Core network 120 could be an ATM and/or IP-based network, for example, and could comprise more than one physical and/or logical network and/or sub-network, as well as interconnecting routers and switches. Other transport technologies are possible as well, as are a variety of network topologies and routing/switching protocols and platforms.

In the context of FIG. 1, core network 120 represents at least the communicative coupling of the attached elements shown, as well as other possible entities that are not shown. Note, however, that the exemplary connectivity between network entities provided via core network 120 is not intended to be limiting with respect to other methods or means of communication between any two or more network entities, elements or components. For example, a group of servers and databases that supports a coordinated set of functions, such as billing or user account services, could communicate within an IP sub-network or LAN that is itself connected to core network via a router, or the like. Other arrangements are possible as well.

As noted above, exemplary network 100 also includes packet network 122, which may be a different physical network from core network 120, a separate virtual network overlaid on core network 120, or some combination of both. Other arrangements are possible as well. Packet network 122 provides packet-data transport and services to users and to network servers and other network entities that require packet-data communications. In a preferred embodiment, packet network 122 is an IP network, capable of supporting, for instance, web browsing, VoIP, and other Internet-like services. Although not shown in FIG. 1, packet network 122 may also include various servers for packet-based services, and provide connectivity to other packet networks, for example those of other service providers, or the public Internet.

Users may access features and services of network 100 via one or more client stations, exemplified in FIG. 1 by client access devices 101, 102, 103, 106, and 108. Each illustrates by way of example a different mode and technology of network access, as well as a different form of client station. For example, mobile stations (MSs) 101, 102 represent third-generation (3G) or fourth-generation (4G) cellular phones, or the like, that may support both circuit-cellular and packet-data communications using CDMA and/or GPRS/GSM cellular radio access technologies, for instance. Telephone 103 represents a landline telephone, such as one used for circuit-based residential service with a local exchange carrier (LEC). Alternatively, telephone 103 could be a digital PBX phone that accesses the LEC via a PBX switch (not shown), for example. Client station 106 represents a wireless intelligent device, such as a packet-telephony (e.g., VoIP) phone, or the like, with wireless local area network (WLAN) access, such as IEEE 802.11 (also referred to as "wireless Ethernet"), to a packet network. Likewise, client station 108 could be a similar type of intelligent device, but with wired LAN access, such as Ethernet, to a packet network. These example client stations are not meant to be limiting, and other types and/or combinations of devices are possible. For instance, client station 106 could be a personal computer (PC) or workstation having a WLAN interface, and client station 108 could be a wired VoIP phone. Further, MS 101, 102 could incorporate technology for WLAN access as well as cellular radio access to a packet-data network, thus supporting so-called dual-mode capability.

Client stations preferably access the network 100 via one or more of the connected access networks, each of which comprises at least one switch, router, or similar entity that includes one or more interfaces to network 100. For example, cellular radio access to network 100 by wireless devices, such as exemplary MS 101 and MS 102, is provided by RAN 109. As illustrated in FIG. 1, RAN 109 comprises base transceiver station (BTS) 110 connected to the network via base station controller (BSC) 112, which in turn is connected both to the circuit-cellular network via MSC 114, and to the packet-data network via packet data serving node (PDSN) 118, by way of packet control function (PCF), which may be included as part of PDSN 118 or in a separate entity. PDSN 118 also includes a connection to core network 120.

In typical operation of RAN 109, BTS 110 provides an air interface link to MS 101, 102 (or similar device), while BSC 112 controls BTS 110, for example assigning specific air interface channels and managing mobility of MS 101, 102 across possibly multiple BTSs under its control. For circuit-cellular services, such as circuit-based telephony, communications are then routed between BSC 112 and MSC 114, which in turn provides connectivity to core network 120, to one or more other MSCs or circuit telephony switches (either directly or via core network 120), or to PSTN 124 via digital trunks or similar links to a switch or switches in the PSTN. For packet-data services, such as web browsing and IP multimedia services, communications are instead routed between BSC 112 and packet network 122 via PDSN 118. It should be noted that even though MS 101 and MS 102 are both shown in FIG. 1 to be associated with RAN 109 for illustrative purposes, in practice they need not actually be associated with the same BTS, BSC, MSC, PDSN, or even the same RAN.

The components of RAN 109 illustrated in FIG. 1 represent functional elements, and although only one of each is shown in the figure, a given deployment may in practice include more than one of any or all them in various configurations. For example, as noted above, a given BSC could control multiple BTSs. Further, an MSC could in turn control multiple BSCs, and a given metropolitan area could include multiple MSCs or even multiple RANs connected via carrier's core network 120 or other interconnecting network, for example. Still further, multiple metropolitan areas, each with a hierarchical arrangement of MSCs, BSCs, and BTSs, or with multiple RANs, for example, could be connected via the carrier's backbone network (e.g., core network 120). Similar arrangements of one-to-many are also possible for PDSNsto-BSCs as well, as are other configurations. The above examples are not mean to be exhaustive or limiting.

Additionally, each functional element of RAN 109 may be implemented as a separate physical entity, or various combinations of them may be integrated into one or more physical platforms. For example, BTS 110 and BSC 112 may be implemented in a single physical device. Similarly, PCF 116 and PDSN 118 could be combined on a single platform. Other physical configurations of the functional elements of the RAN may also be realized.

Access to landline packet-data services in network 100, such as web browsing, VoIP, and email communications, is provided by landline packet access network 127. Represented in FIG. 1 by a single network access server (NAS) 128, landline packet access network 127 could comprise a local area network (LAN), such as an enterprise network, a packet-cable distribution system, a cable modem distribution system, a digital subscriber line (DSL) distribution system, or the like, which provides connectivity between landline subscriber stations and NAS 128. In turn, NAS 128, which could comprise one or more routers, DSL switches, cable modem termination systems, or remote-access chassis, for example, provides connectivity to packet network 122, as well as to core network 120. Alternatively or additionally, landline packet access network 127 may comprise a landline telephone system that provides dial-up connectivity between landline subscriber stations utilizing modems, for example, and NAS 128. Intelligent devices such as client station 108 may have wired connectivity, such as Ethernet, to landline packet access network 127. Preferably, landline packet access network 127 also includes one or more wireless access points (WAPs), such WAP 130, to support wireless WLAN access technologies, such as wireless Ethernet (IEEE 802.11), for example, for devices such as wireless client station 106.

Exemplary methods and systems involve VoIP communications, which may occur over in a network, such as the network 100. With the widespread growth of voice-over-IP (VoIP) technology, client devices such as mobile stations 101, 102, which are equipped to engage in VoIP communications via a RAN such as RAN 109, are becoming more prevalent. Client devices that are configured for VoIP communications via other types of access networks, such as client device 108, are also gaining popularity. In general, client devices configured for VoIP may take any number of forms, including a laptop computer, a desktop computer, a dedicated VoIP phone, or a dual-mode mobile station equipped for CDMA and LAN/WLAN connectivity, among others.

IP Multimedia Subsystem (IMS) Server 132 may be configured to provide VoIP services clients such as mobile stations 101, 103, as well as clients, such as client device 108, which connect via a NAS. Preferably, IMS Server 132 provides service that is independent of the access network through which a client station connects. In an exemplary embodiment, signaling and call control by the IMS server are largely standardized around the Session Initiation Protocol (SIP), while multimedia bearer traffic typically uses the Real Time Protocol (RTP). IMS also leverages other protocols developed by the Internet Engineering Task Force (IETF), such as the Session Description Protocol (SDP) and DIAMETER. Using these or other common protocols, IMS Server 132 may also support applications including push-to-talk (PTT), video over IP, gaming, audio and video streaming, and other multimedia services, in addition to VoIP. Additionally, an IMS infrastructure may support instant messaging, presence, email and social networking applications.

VoIP typically involves a number of types of protocols. In particular, a signaling protocol, such as SIP, may be used to setup, modify and tear down a VoIP call, and possibly for other purposes as well. More specifically, client devices typically set up VoIP communications using SIP messaging, which is used to establish a SIP session between the client device and a signaling gateway such as IMS server 132, having an interface with a packet-based network and an interface with signaling network, such as, for example, a Signaling System #7 (SS7) network. The signaling gateway translates between SIP messages and SS7 messages to facilitate call processing over the SS7 network on behalf of the device.

Further, a Media Transport Protocol, such as RTP, may be used for the transmission of packetized audio (and possibly video) during a VoIP call. Yet further, Real-Time Control Protocol (RTCP) may be used to control the RTP packet flows during a VoIP call, and for other functions, such reporting packet-flow statistics during the VoIP call. Once a VoIP call is established using SIP, RTP is used to for the packetized voice communications between the participants during the call. RTP is an Internet-standard protocol that supports real-time transmission of data for multimedia applications, such as VoIP. RTP provides specific techniques and data structures for packetizing data for transmission, and specifies a data format including a header that allows a client to reconstruct received data. In particular, data in VoIP sessions is formatted into frames, the components of which may include a sequence number (which may be used by client to detect when packets are lost), a payload identification (which specifies the encoding format for data in the frame), a frame indication (which identifies where a frame begins and ends), a source identification (which identifies the client who sent the frame), and intramedia synchronization, which may be used to detect delay jitter and compensate for it. RTP typically runs on top of the User Datagram Protocol (UDP), although other transport protocols may also be used. Additional details and aspects of RTP are provided in RFC 3550, the entirety of which is incorporated herein by reference.

In a typical VoIP call, the signaling path differs from the path used for transport of voice or media data. For example, in a call between two VoIP clients, such as between mobile station 102 and mobile station 106 for instance, SIP signaling may travel from mobile station 102 via BTS 110, BSC 112, PDSN 118, packet network 122, and IMS Server 132, and/or other entities, which may be referred to as the SIP signal path. The path used for data communications (e.g., RTP) during a VoIP call include BTS 110, BSC 112, PDSN 118, and packet network 122, but instead route data through media gateway (GW) 134, which may be referred to the data signal path. Thus, a VoIP call typically includes a SIP session, which involves SIP signaling via the SIP signal path, as well as an RTP session, which involves RTP data flows via the data signal path. A typical VoIP call also involves an RTCP session, which involves RTCP data flows over the data signal path.

In a further aspect, RTCP provides for monitoring of data delivery, so that a client device, such as mobile stations 101, 102, 106 may detect when packets are dropped or lost. To this end, the client device and/or the media gateway may periodically send each other RTCP reports, which may include quality of service (QoS) feedback data such as packet-loss data, round-trip time between a client and media gateway, and/or a measure of jitter, which the client device and/or media gateway may use to adjust their respective data rates in order to compensate for the jitter. Typically, the client device and/or the media gateway transmit RTCP reports on a regular basis, spacing consecutive RTCP reports by an RTCP transmission interval, which is usually made long enough to gather and report statistically meaningful new QoS feedback data. Additional details and aspects of RTCP are provided in IEEE RFC 3550, the entirety of which is incorporated herein by reference.

It should be understood that other supporting protocols may also be involved in a VoIP call, such as Domain Name Server (DNS), Telephone Routing over IP (TRIP), Resource Reservation Setup Protocol (RSVP) Common Open Policy Service (COPS), and Authentication, Authorization, Accounting protocols such as RADIUS and DIAMETER, as well as others. Exemplary embodiments are described by way of example, with reference to VoIP using SIP and RTP (in conjunction with the RTSP protocol for control). It should be understood, however, that other protocols may be used without departing from the scope of the invention.

Figure 2:
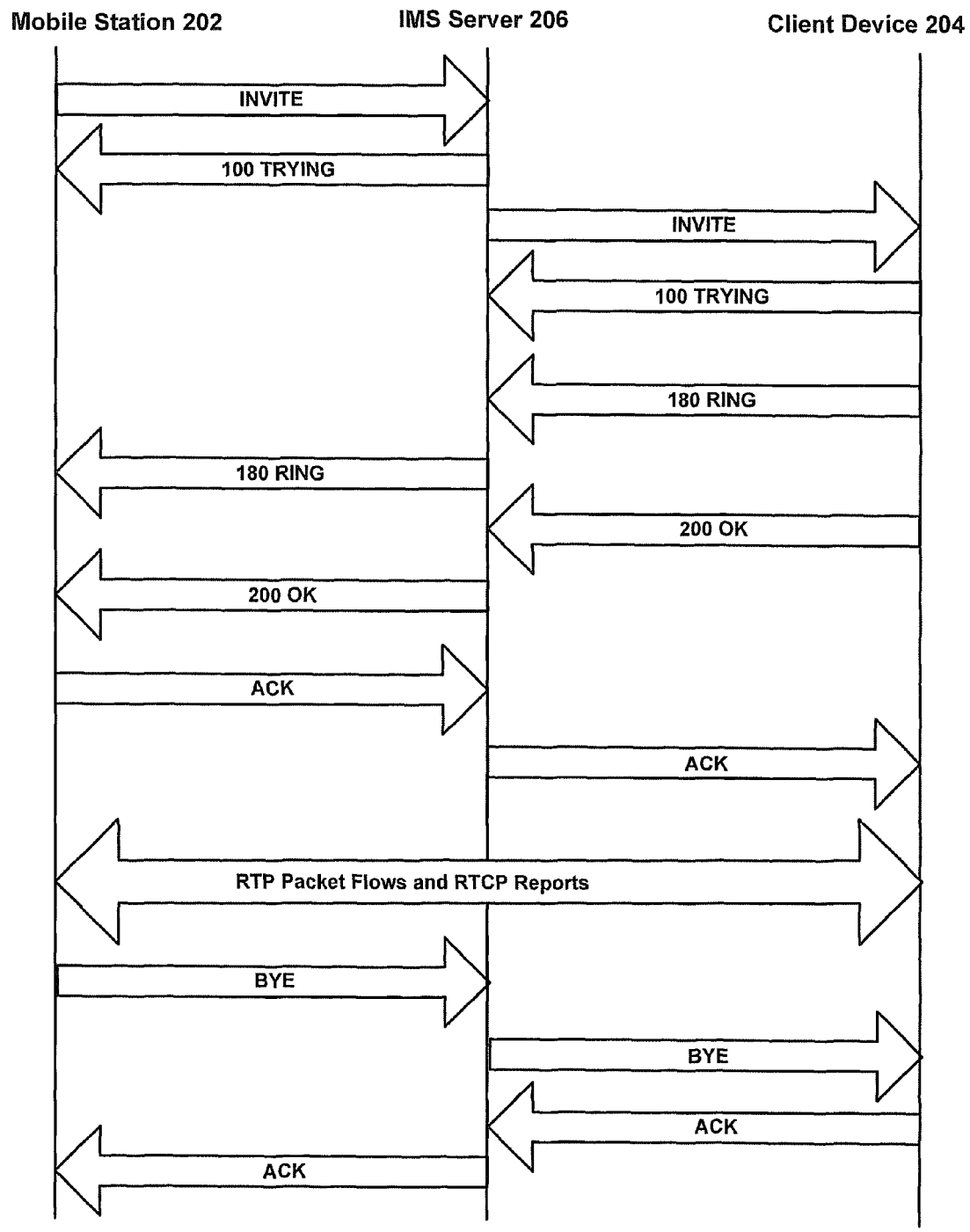
FIG. 2 is a signal-flow diagram illustrating messaging and data flows involved in a VoIP call, according to an exemplary embodiment.

FIG. 2 is a signal-flow diagram illustrating the SIP messaging and RTP/RTCP data flows involved in an exemplary VoIP call between two client devices 202, 204 and an IMS Server 206. In this example, one client device is a mobile station 202, although the client devices may take on other forms as well. In particular, to set up the VoIP call, mobile station 202 may send a SIP INVITE message 20 to IMS Server 206, which then locates and sends the SIP INVITE message to the client device 204. The SIP INVITE message may include various information, including the IP address for mobile station 202, so that client device 204 may send and receive packet data to and from mobile station 202. The IMS Server 206 also sends a SIP "100 TRYING" response to the mobile station 202 to notify the mobile station that it is trying to notify client device 204 of the call. When client device 204 receives the SIP INVITE message, it typically begins ringing or otherwise attempts to notify the user of the device that a call is incoming. Accordingly, client device 204 sends a SIP TRYING 100 response and a SIP RING 180 response to IMS server 206, to indicate that it has received the SIP INVITE message 20 and is attempting to notify its user of the incoming call. IMS server 206 may then send a SIP RING 180 response to mobile station 202, to relay that the client device 204 is attempting to notify its user of the call.

When the user of client device 204 accepts the VoIP call, client device 204 indicates this to IMS server 206 by sending a SIP 200 OK response, which the IMS server 206 then forwards to mobile station 202. The SIP 200 OK response may include various information, including the IP address assigned to the client device 204, so that the mobile station 202 may send packet data to client device 204. Mobile station 202 then acknowledges receipt of SIP OK 200 response by sending a SIP ACK message to IMS server 206, which IMS server 206 then forwards to client device 204. At this point, the VoIP call may begin as both the mobile station 202 and the client device 204 have established SIP sessions with IMS Server, and have been provided with each others' IP addresses to use for the VoIP call.

As shown, communications during the VoIP call take the form of RTP packet flows and RTCP Reports between the mobile station 202 and the client device 204. In particular, the mobile station 202 and the client device 204 may periodically send each other RTCP reports that provide the mobile station 202 and/or the client device 204 with QoS data for the VoIP call. Further, RTCP reports are typically sent by the mobile station 202 and/or the client device 204 at a regularly scheduled interval.

When the VoIP call ends, such as by the user of mobile station 202 hanging up (pressing a button to end the call, for instance), the mobile station 202 sends a SIP BYE message to IMS server 206, which the IMS server then forwards to client device 204. The client device 204 acknowledges SIP BYE message by sending SIP ACK message to the IMS server 206, which in turn forwards SIP ACK message to mobile station 202, thereby ending the VoIP call.

The method illustrated in FIG. 2 demonstrates exemplary signaling when the communication path for RTP packet flows and/or RTCP reports is not disrupted during the VoIP call. However, in some situations, links in the communication path may be broken. For example, the mobile station 202 may lose its connection to the RAN through which it connected for the call, or a link between a media gateway and the client device may go down, and so on. When a break in the communication path between the mobile station 202 and the client device 204 occurs, data may be lost (e.g., packets in RTP packet flow may be dropped and/or RTCP reports may not be received). However, since the SIP session exists independently on the mobile station 202 and the IMS server 206, the SIP session may persist even when the communication path for RTP/RTCP data is down.

Accordingly, in an exemplary embodiment, a VoIP call may be characterized by three different states, depending upon the status of its communication path (i.e., whether or not RTP packets or RTCP Reports are being successfully received) and the status of its SIP session (i.e., active or inactive). First, a VoIP call is said to be in an "active" state when the communication path is functional and participants in the call are properly receiving data (e.g., when RTP packets and/or RTCP reports are being received in an expected manner).

A second state exists when RTP packets and/or RTCP reports are not received in the expected manner (i.e., when RTP packets and/or RTCP reports are not being received as expected) and the SIP session is no longer active, the VoIP call is in the "disconnected" state or simply is said to be "disconnected." (It should be understood that there technically may be no indication of the disconnected state, since there may be no record of a call once it no longer exists.) When a call is disconnected, a new SIP session must be established between the participants in order for VoIP communication to occur. Therefore, the participants must hang up and reconnect to establish a new SIP session, if they wish to continue communicating.

A third state exists when RTP packets and/or RTCP reports are not received in the expected manner, but the SIP session remains active. In this scenario, the VoIP call is considered to be in the "soft inactivity" state. In this state, no communications can occur, but the possibility exists that the communication path may be reestablished, so that communications between call participants can resume without requiring the participants to hang up and reconnect. Specifically, if the communication path is reestablished while the SIP session for the call is still active, the call may simply continue using the existing SIP session.

Figure 3:
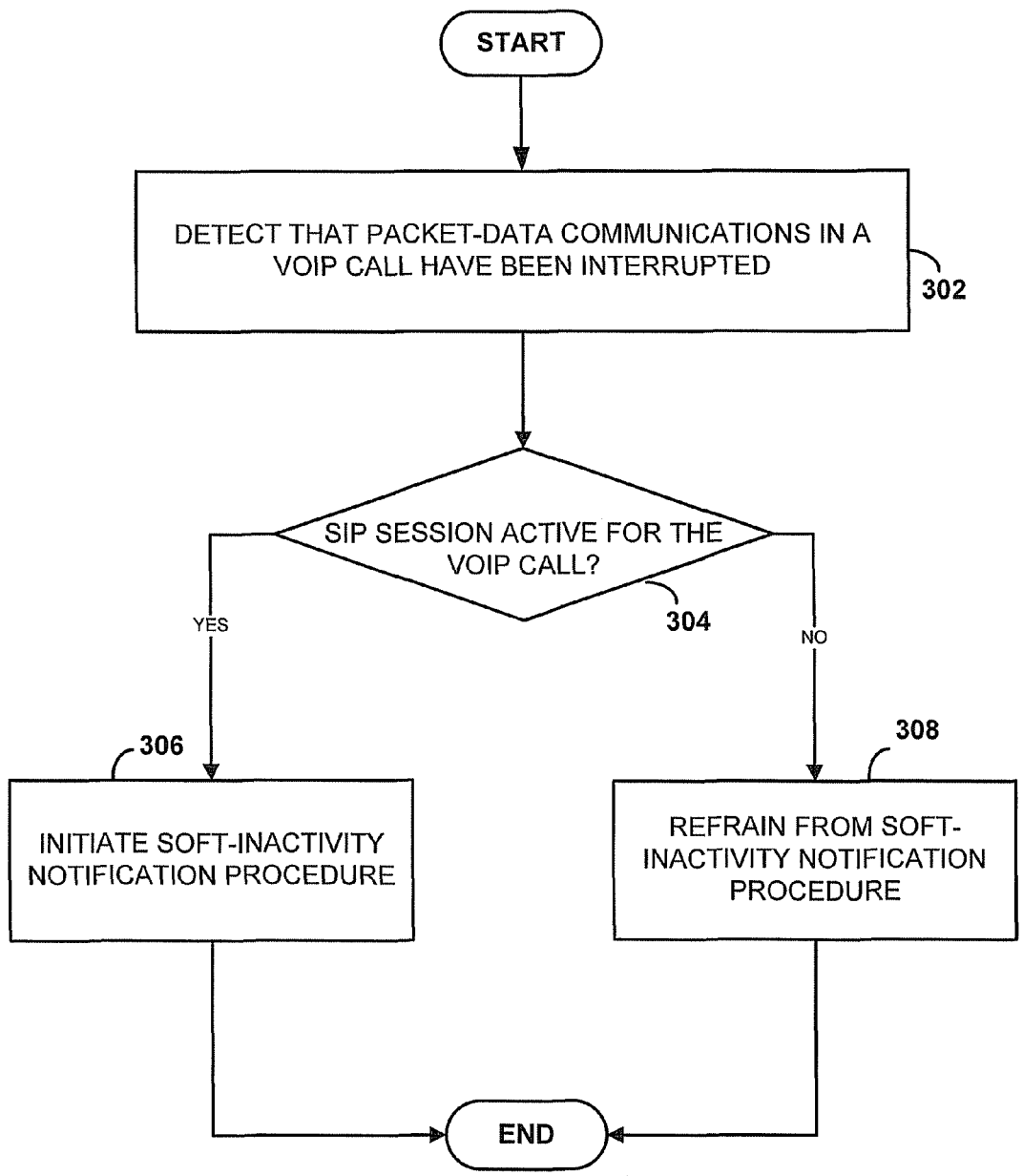
FIG. 3 is a flow chart illustrating a method for providing a soft-inactivity notification during a VoIP call, according to an exemplary embodiment.

FIG. 3 is a flow chart illustrating a method for providing a soft-inactivity notification for a VoIP call, according to an exemplary embodiment. The method is typically carried out by a VoIP client device, and preferably by a mobile station that is a participant in a VoIP call. Accordingly, the method may be described by way of example herein, with reference to a mobile station performing the method or portions thereof. However, it should be understood that other entities or combinations of entities may implement the method or portions thereof, without departing from the scope of the invention.

In an exemplary embodiment, the method involves a mobile station detecting that packet-data communications in its VoIP call have been interrupted, as shown by block 302. In response to an interruption in the packet-data communications, the mobile station makes a determination as to whether or not the SIP session for the VoIP call is active, as shown by block 304. Then, if the SIP session is active, the mobile station initiates a soft-inactivity notification procedure, as shown by block 306. On the other hand, if the SIP session is inactive (i.e., not active), the mobile station refrains from initiating the soft-inactivity notification procedure, as shown by block 308.

The step of detecting that packet-data communications have been interrupted, as shown by block 302, may involve various techniques. For example, RTP packet flow and/or RTCP reports may cease when the RF link between a mobile station and the RN is broken (e.g., when the mobile station loses the RF signal in its serving BTS, and is unable to find another BTS to hand off to). Accordingly, the mobile station may determine that no RTP packets have been received for a predetermined period of time, and therefore conclude that packet-data communications have been interrupted. As another example, the mobile station may determine that it has not received a predetermined number of RTCP reports that it was scheduled to receive, and thus infer that packet-data communications have been interrupted. Alternatively, the mobile station may determine that both RTP packets and RTCP reports have not been received. Other techniques are also possible.

In practice, an exemplary method, such as that illustrated by FIG. 3, may be implemented to notify a user when connectivity to the RAN has been lost (i.e., that the RF link between the mobile station and RAN is broken), but might be regained if the user holds. Accordingly, detecting that packet-data communications have been interrupted may alternatively involve determining that the mobile station is no longer receiving a signal from the RAN (i.e., from at least one BTS in the RN). In particular, techniques employed by a mobile station to monitor signal strength, such as by determining the strength of available pilot signals, may be employed. For example, when a mobile station does not detect a pilot signal from any BTS for a predetermined period of time, it may conclude that connectivity with the RAN has been lost, and infer that packet-data communications in the VoIP will be interrupted as a result. Other examples are also possible.

In a further aspect, when the mobile station initiates a soft-inactivity notification procedure, the mobile station may also begin monitoring its packet-data connection and/or the status of the SIP session. Then, if packet-data connectivity is not regained and the SIP session terminates (i.e., is not active), the mobile station may end the soft-inactivity notification procedure. Alternatively, if the packet-data communications resume before the SIP session terminates, the mobile station ends the soft-inactivity notification procedure upon determining that the packet-data communications have resumed. As a specific example, the soft-inactivity notification procedure may involve the mobile station playing an audible tone. When the mobile station begins playing the tone, the mobile station may also begin monitoring the state of the SIP session. Then, if the SIP session ends such as by timing out, the mobile station stops playing the audible tone. Alternatively, packet-data communications may resume while the SIP session is still active. In this scenario, the mobile station may determine that packet-data communications have resumed, such as by detecting receipt of RTP packets or receipt of one or more RTCP Reports, and responsively end the soft-inactivity notification procedure.

In another aspect, when the mobile station ends the soft-inactivity notification procedure because the SIP session has ended, the mobile station may also initiate a disconnect notification procedure. For example, when the SIP session times out, the mobile station may be play a recognizable tone to indicate that the call has been disconnected. Additionally or alternatively, the mobile station may play a pre-recorded message, which may indicate that the VoIP call has been dropped and/or that the user of the mobile station should hang up and reconnect if they wish to resume communications. Other disconnect notification procedures are also possible.

Figure 4:
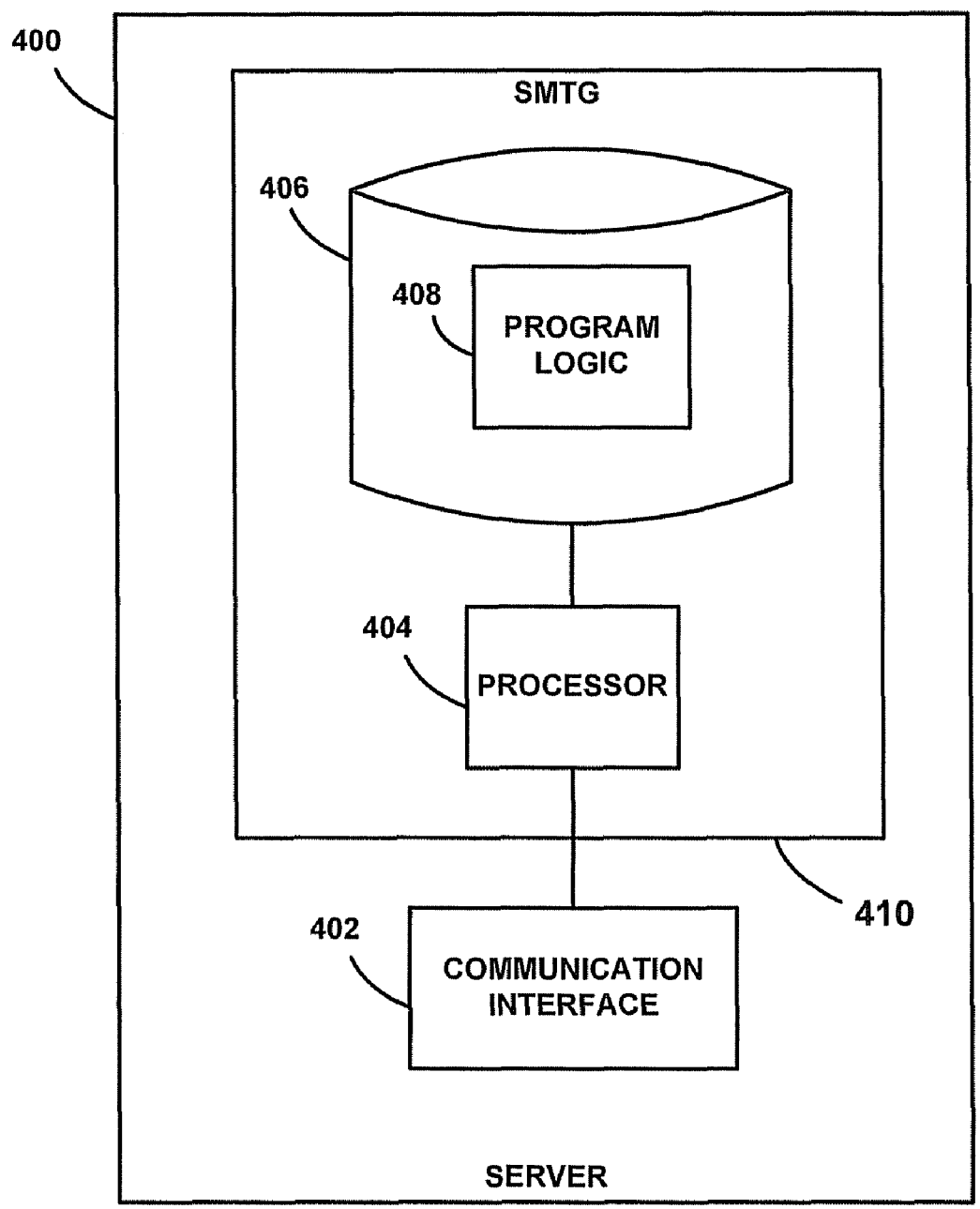
FIG. 4 is a block diagram illustrating a system configured for a soft-inactivity notification procedure during a VoIP call, according to an exemplary embodiment.

FIG. 4 is a block diagram illustrating a system configured to provide soft-inactivity notification for VoIP calls, according to an exemplary embodiment. According to a first exemplary embodiment, the system may be implemented in, or take the form of a mobile station 400 configured to engage in VoIP communications. The mobile station may include a communication interface 402, a processor 404, and data storage 406. Data storage 406 stores program logic or instructions 408 that are executable by the processor 404 to engage in VoIP communications. In general, the program logic 408 may be executable by the processor 404 to carry out the functionality of the system described herein and otherwise.

In particular, the program logic may be carried out to (a) detect that packet-data communications in the VoIP call have been interrupted, (b) in response to detecting that the packet-data communications have been interrupted, determine whether or not the SIP session is active, (c) if the SIP session is active, then initiate a soft-inactivity notification procedure, and (d) if the SIP session is inactive, then refrain from initiating the soft-inactivity notification procedure. The mobile station may implement the above functionality in any manner described in reference to FIG. 3, although other implementations are also possible.

In an exemplary embodiment, the system takes the form of a Session Monitor Tone Generator (SMTG) 410, which includes processor 404 and data storage 406. The SMTG implements program logic that operates in conjunction with the SIP, RTP, and/or RTCP functionality of mobile station 400. In particular, the SMTG 410 monitors RTP packet flows and/or RTCP Reports to detect when packet-data communications in a VoIP call are interrupted. Further, the SMTG 410 monitors the state of a SIP session (possibly only after it has detected an interruption in the VoIP call) to determine when the SIP session is active and/or when the SIP session terminates or ends. Accordingly, the SMTG 410 may initiate a soft-inactivity notification procedure when it detects that both (1) RTP packet flows have ceased for a predetermined period of time and/or a predetermined number of expected RTCP reports have not been received and (2) the SIP session for the VoIP call is still active.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method for providing a soft-inactivity notification during a VoIP call, wherein the VoIP call comprises a SIP session and packet-data communications between participants in the VoIP call, the method comprising:
   detecting that packet-data communications in the VoIP call have been interrupted;
   in response to detecting that the packet-data communications have been interrupted, making a determination as to whether or not the SIP session is active;
   if the SIP session is active, then initiating a soft-inactivity notification procedure; and otherwise, if the SIP session is inactive, refraining from initiating the soft-inactivity notification procedure.

2. The method of claim 1, wherein detecting that the packet-data communications in the VoIP call have been interrupted comprises determining that no RTP packets have been received for a predetermined period of time.

3. The method of claim 1, wherein detecting that the packet-data communications in the VoIP call have been interrupted comprises determining that a predetermined number of scheduled RTCP reports have not been received.

4. The method of claim 1, wherein the soft-inactivity notification procedure comprises playing an audible alert.

5. The method of claim 1, further comprising:
if the SIP session is active, then after initiating the soft-inactivity notification procedure, monitoring the SIP session; and
if the SIP session terminates, then ending the soft-inactivity notification procedure.

6. The method of claim 5, further comprising: if the SIP session terminates, then initiating a disconnect notification procedure.

7. The method of claim 1, further comprising:
if the SIP session is active, then after initiating the soft-inactivity notification procedure, determining that the packet-data communications in the VoIP call have resumed and responsively ending the soft-inactivity notification procedure.

8. The method of claim 7, wherein determining that the packet-data communications in the VoIP call have resumed comprises receiving one or more RTP packets.

9. The method of claim 7, wherein determining that the packet-data communications in the VoIP call have resumed comprises receiving a predetermined number of RTCP reports.

10. The method of claim 1, wherein the method is carried out by a mobile station operating in a radio access network, wherein the mobile station is one of the participants in the VoIP call.

11. The method of claim 10, wherein the mobile station communicates with the radio access network via a radio-frequency link, and wherein determining that the packet-data communications in the VoIP call have been interrupted comprises determining that the radio-frequency link is broken.

12. A system configured for a soft-inactivity notification procedure during a VoIP call, wherein the VoIP call comprises a SIP session and packet-data communications between participants in the VoIP call, the system comprising:
a communication interface configured to send and receive VoIP communications;
data storage; and
program logic stored in the data storage and executable by at least one processor to:
(a) detect that packet-data communications in the VoIP call have been interrupted;
(b) in response to detecting that the packet-data communications have been interrupted, determine whether or not the SIP session is active;
(c) if the SIP session is active, then initiate a soft-inactivity notification procedure; and
(d) if the SIP session is inactive, then refrain from initiation of the soft-inactivity notification procedure.

13. The system of claim 12, wherein the program logic stored in the data storage and executable by the at least one processor to detect that packet-data communications in the VoIP call have been interrupted comprises:
program logic stored in the data storage and executable by the at least one processor to determine that no RTP packets have been received for a predetermined period of time.

14. The system of claim 12, wherein the program logic stored in the data storage and executable by the at least one processor to detect that packet-data communications in the VoIP call have been interrupted comprises:
program logic stored in the data storage and executable by the at least one processor to determine that a predetermined number of scheduled RTCP reports have not been received.

15. The system of claim 12, wherein the soft-inactivity notification procedure comprises an audible alert.

16. The system of claim 12, further comprising program logic stored in the data storage and executable by the at least one processor to:
after initiation of the soft-inactivity notification procedure, monitor the SIP session; and
if the SIP session terminates, then end the soft-inactivity notification procedure.

17. The system of claim 12, further comprising program logic stored in the data storage and executable by the at least one processor to:
if the SIP session terminates, initiate a disconnect notification procedure.

18. The system of claim 12, further comprising program logic stored in the data storage and executable by the at least one processor to:
after initiation of the soft-inactivity notification procedure, determine that the packet-data communications in the VoIP call have resumed and responsively end the soft-inactivity notification procedure.

19. The system of claim 12, wherein the system is implemented in a mobile station operating in a radio access network, wherein the mobile station is one of the participants in the VoIP call.

20. The system of claim 19, wherein the mobile station wherein the communication interface is configured to communicate with the radio access network via a radio-frequency link, wherein the program logic executable to determine that the packet-data communications in the VoIP call have been interrupted comprises:
program logic stored in the data storage and executable by the at least one processor to determine that the radio-frequency link is broken.

* * * * *